United States Patent [19]
Alexeev et al.

[11] Patent Number: 6,116,034
[45] Date of Patent: Sep. 12, 2000

[54] SYSTEM FOR PRODUCING FRESH WATER FROM ATMOSPHERIC AIR

[75] Inventors: Vyacheslav Viktorovich Alexeev; Konstantin V Chekarev; Nariman Akhmed-ogly Rustamov, all of Moscow, Russian Federation

[73] Assignee: M & K Associates, Inc., Superior, Colo.

[21] Appl. No.: 09/257,386

[22] Filed: Feb. 25, 1999

[30] Foreign Application Priority Data

Feb. 25, 1998 [RU] Russian Federation ............. 98104583

[51] Int. Cl.⁷ .................................................. F25D 17/06
[52] U.S. Cl. .................................. 62/92; 62/271; 62/272; 62/291
[58] Field of Search ................................. 62/93, 271, 272, 62/291

[56] References Cited

U.S. PATENT DOCUMENTS

| | | | |
|---|---|---|---|
| 3,905,203 | 9/1975 | Jacob | 62/93 |
| 3,910,062 | 10/1975 | Rojas | 62/93 |
| 4,050,262 | 9/1977 | Mehnert | 62/93 |
| 4,148,617 | 4/1979 | Clark | 62/93 |
| 4,351,651 | 9/1982 | Coureya | 62/93 |
| 5,106,512 | 4/1992 | Reidy | 210/744 |
| 5,149,446 | 9/1992 | Reidy | 62/93 |
| 5,233,843 | 8/1993 | Clarke | 62/93 |
| 5,517,829 | 5/1996 | Michael | 62/272 |
| 5,669,221 | 9/1997 | LeBleu et al. | 62/92 |
| 5,701,749 | 12/1997 | Zakryk | 62/93 |
| 5,729,981 | 3/1998 | Markus et al. | 62/93 |
| 5,857,344 | 1/1999 | Rosenthal | 62/93 |

FOREIGN PATENT DOCUMENTS

| | | | |
|---|---|---|---|
| 3313711 A1 | 4/1983 | Germany | E03B 3/28 |
| 2056479 | 3/1996 | Russian Federation . | |

*Primary Examiner*—Henry Bennett
*Assistant Examiner*—Mark Shulman
*Attorney, Agent, or Firm*—Greenlee, Winner and Sullivan, P.C.

[57] ABSTRACT

A system for condensation and collection of atmospheric water is provided made up of a system having an aperture pipe at the top for airflow, a condensation material providing condensation surfaces within the system; openings, ducts or other spaces for conducting a flow of moisture-containing air from outside the system where it comes into contact with the condensation surfaces; and a water tank containing water heated during the daytime by the sun or by another heat source near the top of the system in the aperture pipe for heating surrounding air from which the water has been removed by condensation on the condensation surface, so that air flows out of the system through the aperture pipe at the top, drawing moisture-laden air from outside into the system. Heat transfer tubes extend into the system to transfer heat from within the system to the outside atmosphere when the temperature outside is less than that inside the system so that the condensation surfaces and the air within the system cool, facilitating condensation. Condensed water is collected and removed for use without the requirement of further processing. No artificial energy source is required.

19 Claims, 2 Drawing Sheets

SYSTEM FOR PRODUCING FRESH WATER FROM ATMOSPHERIC AIR

CROSS-REFERENCE TO RELATED APPLICATION

This application claims priority from Russian Patent Application No. 98104583 filed Feb. 25, 1998.

BACKGROUND OF THE INVENTION

The problem of fresh water becomes more acute each year in many regions of the world as a result of population growth, climate changes and environmental pollution. In many regions of the world there is insufficient water to satisfy the needs of agriculture, industry, and even personal needs for drinking water. In other regions where water is available, it is not potable and has to undergo expensive processing, which can be environmentally polluting, to be useful.

The aquifers of the world on which agriculture depends in drier regions are being drained of their ground water faster than the reserves can be replaced by natural percolation of rainfall and runoff. For example, the Ogallala aquifer, a principal water source of the central United States, experienced a three-meter drop through one-fifth of its area during the 1980s alone. Now it is depleted by about a million hectares. Still worse deficits are building in other countries which can least afford it. Beijing's aquifer fell 37 meters in the past 30 years, while the ground water reserves of the Arabian peninsula are expected to be exhausted by 2050. On a global scale, humanity is reaching the limit of readily available water supplies, now using more than half that available in rivers and other runoff channels. By 2025, forty percent of the world's population will be living in countries with chronic water scarcity.

The main sources of fresh water are rivers, lakes and artesian wells. The costs of producing purified water from conventional purification plants from these sources is about twenty to fifty cents per cubic meter.

Alternative methods of water production include desalinization for production of fresh water from seawater using distillation, electrodialysis and reverse osmosis. Limitations of desalination include the need to locate the plant on the seaside, requiring a major transport system for application of the water inland for agricultural or municipal purposes. In addition, desalinization plants may cause air pollution from the burning of fossil fuels to drive the system and environmental pollution from the disposal of accumulated salt brine. The cost of fresh water from desalination plants is between about $1.20 and $1.80 per cubic meter.

Each year 577,000 $km^3$ of water evaporates from the land and ocean surfaces. This major source of renewable fresh water, atmospheric water, is hardly being used. Half the total atmospheric water is contained in the lower 1.5 km of the atmosphere, and more than 99% in the troposphere. The mean absolute humidity near the earth's surface is 11 $g/m^3$. In the tropics it is 25 $g/m^3$ or even higher. For example in Djibouti there is almost no annual rainfall, but the humidity is 18–24 $g/m^3$. The amount of water moving above each ten square meters in the Arabian and Sahara deserts has the volume of a lake having an area of about one square kilometer and a depth of 50 meters. In Israel 190 to 200 nights are characterized by 100% humidity.

In Feodosiya Russia, an ancient system of fountains, built c. 300 to 1800 AD, used water collected from detritus heaps in addition to wells and mountain runoff. These detritus heaps, two to five meters high and one to two thousand cubic meters or more in volume, were used to collect rainwater, and in drought times they condensed moisture from the atmosphere. The heaps were cone-shaped with a deep crater at the top and horseshoe-shaped hollows in the direction of drainage. Because of this shape, maximum heating of the heap corresponded to minimum heating area, so inside the heap the temperature was extremely different at different times of day, giving rise to convention flows inside the heap that resulted in moist air condensation.

Modern-day efforts to take advantage of atmospheric water have been underway in the Soviet Union since the mid-1930s. Systems with production capacities of up to 2000 $m^3$ per day have been developed for large municipal or agricultural applications in the Crimean region.

German patent application No. 3313711 discloses a plant for producing fresh water from moist air using solar energy. The plant uses solar batteries, a refrigerating unit, a water header for collecting water, and an air duct in which an evaporator of the refrigerating unit and a fan are placed. This plant operates by using electrical power from solar batteries to power a refrigerating unit which feeds cold air into a condenser. Using a fan, moist air is blown through an air duct in which the condenser is placed. As a result of contact with the condenser surface, the air is cooled and the contained water vapor becomes saturated, is partially condensed on the condenser surface, and drains down into the water header.

Russian Federation Patent No. 2056479 discloses a plant for producing water from atmospheric air by accumulating cold at night. The plant comprises solar batteries, a refrigerating unit, a cold accumulator in the form of a heat-insulated tank filled with water connected through a hydraulic pump and a valve to the refrigerating unit, and a condenser placed in the air duct together with a drop catcher and a fan. A water header is located under the opening in the air duct. During the day, electrical power from solar batteries is delivered to the refrigerating unit which generates cold. The refrigerating unit is connected to a heat-insulated tank through a valve. Using a hydraulic pump, the water contained in the tank is pumped through the refrigerating unit and cooled, with the resulting accumulation of cold in the heat-insulated tank. Then the tank is disconnected from the refrigerating unit using a valve and connected to the condenser. As soon as the air moisture becomes close to 100%, the hydraulic pump and fan are switched on in order to pump cold water and moist air through the condenser. The water vapor in the air is condensed on the condenser surface, and the drops contained in it are caught by the drop catcher and drain down to a water header.

Drawbacks of these systems are that they require the use of fans, pumps and refrigerating units requiring electrical power.

It is an object of the present invention to provide a system for producing fresh water from atmospheric air not requiring the use of electrical or other artificial energy. Using the systems of this invention, fresh water can be produced at a cost of about ten to twenty cents per cubic meter.

SUMMARY OF THE INVENTION

This invention provides a system for condensation of fresh water from the atmosphere requiring no further processing. The cost of production is on the order of ten times less than current conventional methods, and capital investment required is five to ten times less than conventional systems. The systems of this invention do not contribute to environmental pollution, require minimum maintenance for operation, can be manufactured in any size required, from small portable units to produce water required for individual and household needs, up to large installations to produce water needed for large industrial and agricultural plants.

Specifically, the system for collection of atmospheric water of this invention comprises:

a) a condensation material within said system providing condensation surfaces;

b) an aperture pipe at the top of said system adapted to allow airflow therethrough;

c) means for conducting a flow of moisture-containing air from outside said system into said system into contact with said condensation surfaces;

d) means for inducing said flow of moisture-containing air through said system;

e) heat-conductive means for transferring heat out of said system and cooling said condensation surfaces; and f) collection means for collecting water condensed on said condensation surfaces.

The system preferably also comprises water-conducting means, such as a drain and pipes for conducting condensed water out of said system to a storage tank or tap for operation by the ultimate consumer of the water.

The system is preferably adapted and constructed such that atmospheric water is collected therefrom without the use of an artificial energy supply.

The system can be a self-contained portable unit of dimensions about one meter in diameter by about one meter high and a typical system of about twenty meters in diameter by five meters high, and capable of condensing at the larger size up to about 100 cubic meters of water per day. Systems can be modular of varying size to produce large quantities of water depending on demand.

The water produced by this system is condensed from water contained in the atmosphere in the form of molecular water, fog, vapor, or clouds.

The system is equipped with an aperture pipe at the top, i.e., anywhere in the upper half thereof, but preferably at the uppermost point, to allow air inside the system to flow up and out of the system.

A special condensation material disposed within the system provides the condensation surfaces. The condensation material completely fills the interior of the system except for channels to provide for air flow within the system. The condensation surface may be made of any material providing a large surface area in the system. The condensation material may be made of porous limestone, diatomaceous earth, porous ceramic or other similar materials having a porous and capillary structure, and providing a large surface area for condensation. Preferably, the condensation material is contained in an open-grid basket-type structure made of a durable material, preferably stainless steel, filled with "rocks" or "pebbles" of the condensation material, the structure providing passages for air circulation through the materials. As shown in FIG. 1, the condensation material may be placed in brick-like modules made of open-weave metallic material. Each such module is preferably about 1.5 m long by 0.5 m high by 0.5 m wide, however the specific size will vary depending on final design parameters.

In a preferred embodiment, the condensation surface includes a capillary material which provides fine structures providing capillary spaces to enhance condensation. Use of capillary material which is porous and has a large surface area can allow for water condensation even when vapor pressure is less than 100%.

The means for conducting a flow of moisture-containing air from outside the system into the system include at least one opening into the system, preferably in the bottom half thereof, and more preferably at the bottom edge, and preferably a duct or ducts to convey and distribute air to all areas of the bottom of the system. The ducts are preferably pipes or tubes with holes pierced through their walls for passage of air. They may also be void spaces formed in the condensation material. Preferably, there are a plurality of openings into the system, and preferably each opening has a duct attached leading to the center of the system. As will be appreciated by those skilled in the art, sufficient air ducts should be provided to ensure a free flow of air through the system.

The means for inducing the flow of moisture-containing air through the system include a heat source in the aperture pipe to heat the air in contact with the heat source and cause it to rise, pulling air within the system upward through the aperture pipe and drawing fresh air in through the openings near the bottom. In a preferred embodiment, the heat source is a tank holding fluid, preferably water, heated by the sun during the day. The heat source has a volume sufficient to ensure air flow through the system and preferably reaches a temperature of at least about 60° C.

The heat source is preferably within the aperture pipe to promote a stack effect drawing cooler air upward and bringing outside air through the openings and ducts as the hot air rises. The aperture pipe may be made of any suitable material including metal, concrete, rock, or plastic surrounding a frame made of wood or other material.

The means for inducing airflow within the system may also include an assembly of vertical vanes within the system to produce a cyclonic effect. Preferably, a set of ducts radiates outward from a central void space which is part of the aperture pipe and leads to the outside atmosphere. The vanes are placed within the central void space and convective air flow is enhanced by sweeping air through the vanes into the interior of the assembly, which is open at the top, and producing a cyclonic air movement arising from the void at the center of the vanes, thereby distributing air throughout the interior of the system. The exact size and configuration of the assembly of vertical vanes is defined by the system size and is sufficient to provide the necessary air flow to achieve the desired water production for the system.

The heat-conductive means for transferring heat out of said system and cooling the condensation surface and the air inside the system may be made of any heat-conductive material such as metal, preferably in the form of sealed tubes containing a heat-conductive liquid, preferably water. Other heat-conductive liquids known to the art may be used. The heat-conductive means (also referred to herein as "heat transfer means") extend from the outside atmosphere into the interior of the system. Preferably the heat-transfer means extend to near the center of the system and extend a distance outside the system to remove heat from the system without heating up the system. The heat-conductive means are most efficient when their surface area is maximized, e.g. through providing ribs or other types of dimpled structure to the tubes or bars. In addition, they may comprise heat-transfer vanes, radiation bulbs or other structures to facilitate radiation of heat to the outside. The number of heat-conductive tubes and spacing of such tubes will depend on the size of the system and temperatures at which it operates as will be readily ascertainable by those skilled in the art without undue experimentation.

The collection means for collecting water include troughs, basins, absorbent materials, or other means known to the art.

Preferably, the bottom surface of the system is a water accumulator, preferably in the form of an inverted cone-shaped structure which may be made of metal, concrete, or any other material which does not absorb water, and slopes gently downward toward the center. The water-collection means are placed beneath areas where water is condensing on the condensation surface, so that water may drop from the surface into or onto the collection means. If an absorbent material is used, it may be placed in contact with the condensation surfaces whereby it can fill with water by means of capillary action.

A typical system of this invention has a height of about five meters, a diameter of about 20 meters, would require a water tank of about three cubic meters, and air ducts at two levels configured radially with about 10 ducts on each level. A unit this size would require about 20 heat-transfer tubes. As will be appreciated by those skilled in the art, the system can be scaled up or down to meet water-production needs without undue experimentation.

If artificial power is required, e.g., to operate vanes to facilitate air flow, solar batteries at the site of the condenser device of this invention, charged by the sun during daylight hours are preferred. Other power sources may also be used. However, the preferred embodiment of this system is especially adapted to be used without the necessity for electrical or other artificial power.

A method for making a system for collection of atmospheric water is also provided herein comprising assembling the above-described components to form the system. Large-scale systems of this invention can be constructed primarily from locally-available materials.

A method for condensing water from the atmosphere is also provided herein comprising placing a condensation system as described above into an environment suitable for obtaining condensed water from the atmosphere. The systems of this invention are capable of operating at temperatures from 0° C. to about 40° C., preferably from about 15° C. to about 30° C., and atmospheric water content of greater than or equal to about 5 g/m$^3$.

The system works as follows: At night the temperature of the ground surface and air begins to decrease by radiation and, especially in arid regions of a hot belt of the earth, the temperature drops below the dew point. When the temperature of the air becomes lower than the temperature of the heat-conducting tube, it begins to cool the condensation material inside the system. In the water tank in the aperture pipe there is warm water which has been heated by the solar heater and this creates a flow of warm air. As a result, a pressure differential is created and atmospheric air from the ducts goes to the lower zones of the condensation material, builds up and then exhausts through the aperture pipe. If the humidity of the air is 100%, the water vapor in it is condensed on the condensation material. If the humidity of the air is less than 100%, the air is cooled to a temperature at which it becomes saturated. The process of condensation of water vapor proceeds well in the afternoon, when warm air is cooled by the condensation material to saturation temperature. In such mode the installation works in daylight. In daytime the differential heating by solar rays promotes the creation of air flows through the condensation material, because it creates a temperature gradient. The system therefore does not require artificial energy sources.

Once the system has been placed or constructed in a suitable environment, all that is required of the user is to remove water from the system for use. In the event absorbent materials are used to collect water, these can be removed and replaced.

The water produced using the devices and methods of this invention is fresh and requires no further processing.

DETAILED DESCRIPTION

Figure 1:
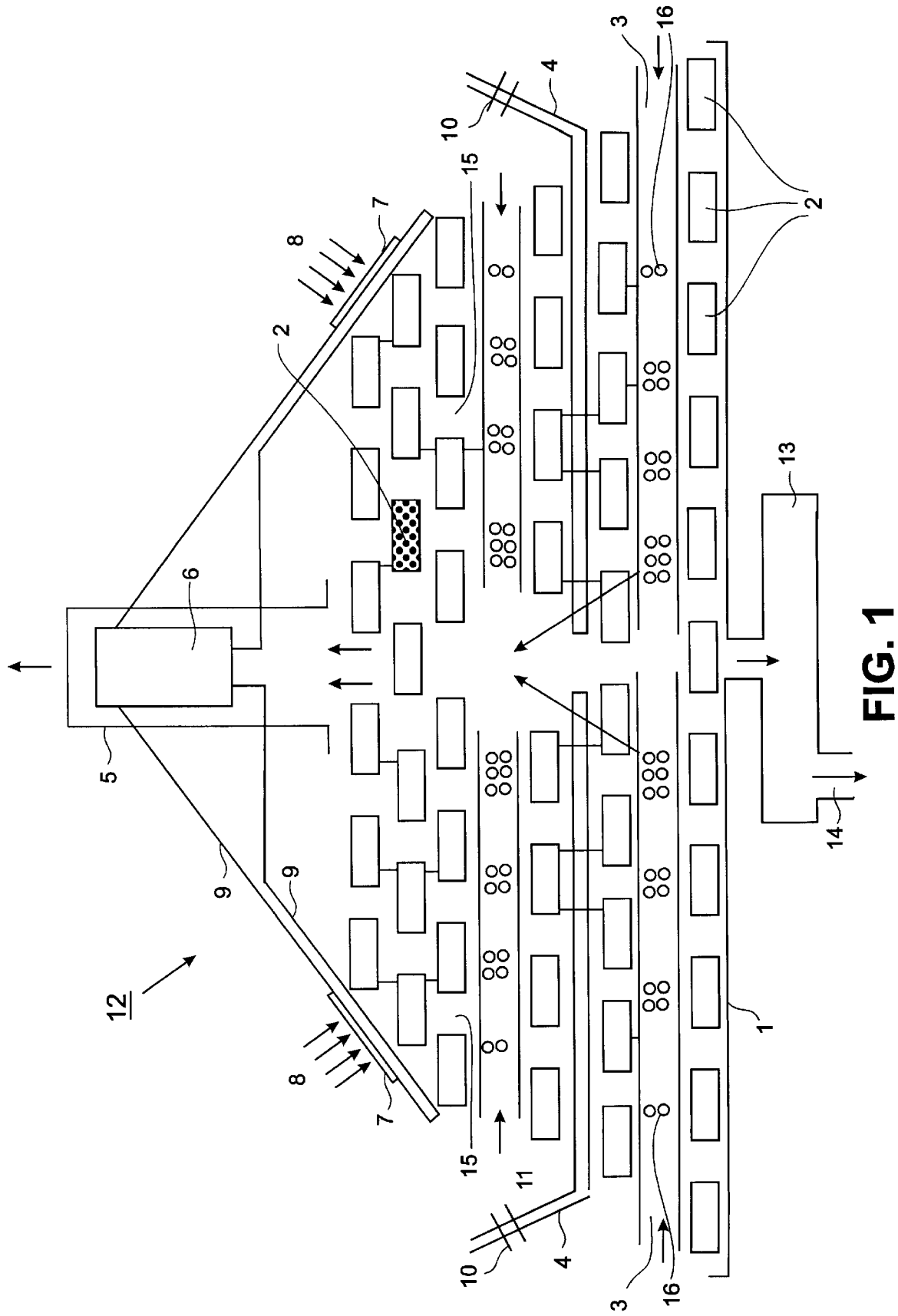
FIG. 1 is a schematic diagram of a cross-section of a water-condensing system of this invention.

FIG. 1 shows a schematic diagram of a cross-section of water condensing system 12 of this invention. The system comprises a water accumulator 1, preferably made of a hard material, such as metal, plastic ceramic, etc., water storage tank 13 and drain pipe 14. A condensation material 2, preferably a porous, capillary material of high condensation surface area and permeable to air as a result of air flow channels 15 formed therein, is disposed above water accumulator 1. Air flow ducts 3 of metal pierced with holes 16 are used to move air from the outside into the system. Arrows indicate the direction of airflow. The system is fitted with an aperture pipe 5 at the top to allow airflow out of the system. Solar heaters 7 collect heat from solar rays 8 during the day and water in the solar heater 7 circulates through heater pipes 9 to water tank 6 where it heats the surrounding air, causing a stack effect in aperture pipe 5. The system is penetrated by heat-conductive tubes 4 which are made of heat-conductive material, preferably metal and preferably filled with heat transfer fluid, preferably water. The head-conductive tubes 4 are preferably fabricated with ribs 11 both on the length of the tube which extends into the system and out the length extending out into the atmosphere. The ends of the heat-conductive tubes are fitted with a black body emitter 10 such as heat transfer vanes, or other structures such as bulbs, branches, and the like to facilitate and enhance heat removal to the atmosphere.

At night, the ground surface and air temperatures decrease due to radiation cooling. As the air temperature becomes lower than the temperature of the heat-conductive tubes, it begins to cool these tubes and the lower temperature is transferred to the inside of the system and cools the condensation surfaces 2. The water tank 6 which retains heat absorbed from the solar rays 8 during the day, heats the surrounding air and causes it to rise and exit through aperture pipe 5 creating a stack effect to draw moist, humid air from the atmosphere through air ducts 3 into system 12. Condensed water forming on the cool condensation surfaces falls by gravity onto water accumulator 1 and runs into storage tank 13 and then to the consumer through a drainpipe 14. The system also operates to condense water during the day when direct heat on the outside of the system heats the air inside causing it to rise and pull cooler moist air in through ducts 3 until it becomes too hot inside the system for condensation to occur.

Figure 2:
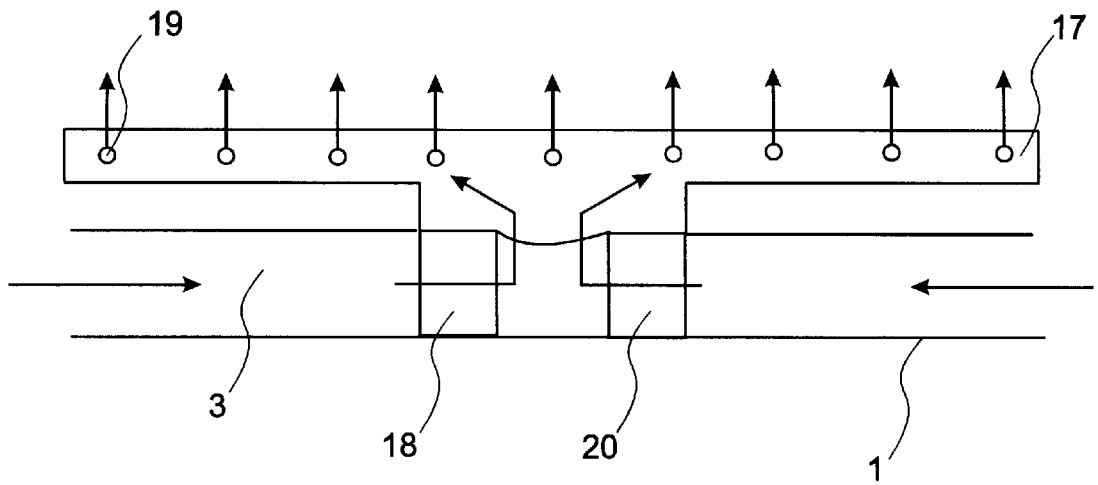
FIG. 2 is a schematic cross-section of an alternative embodiment of this invention using a vane assembly to enhance air flow.

In FIG. 2 an alternative embodiment is shown which uses an assembly of vanes 20 comprising vanes 18 so that air flow (indicated by arrows) through the vanes 18 into the air ducts 3, which are radially arranged around a central void in which the assembly 20 is placed, enhances the flow of air into the ducts 3. Airflow movement through the vanes 18 produces cyclonic airflow to distribute the cooler, moister air from the outside atmosphere more efficiently through the system.

Distribution baffle 17, which is made up of a series of closed-end tubes with air holes 19, radiates outward from the top of the assembly 20, to facilitate air distribution through the system.

Figure 3:
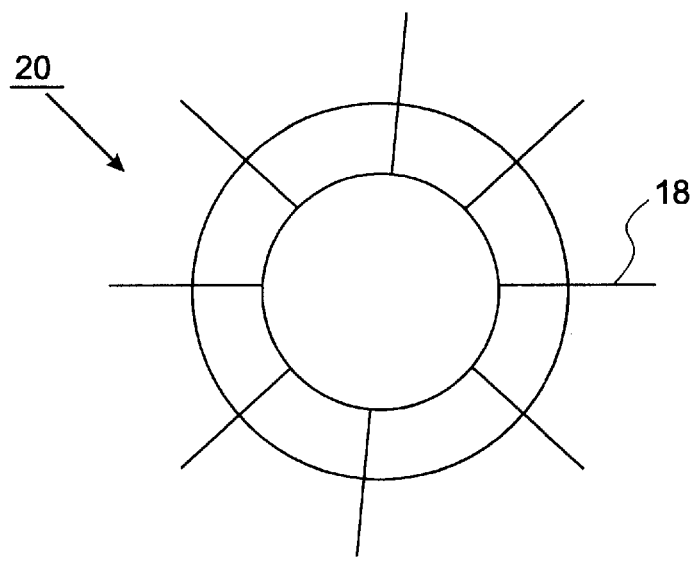
FIG. 3 is a schematic diagram of the vertical vane assembly used to induce air flow in the water-condensing system of this invention.

FIG. 3 shows a diagram of vertical vane assembly 20 having vanes 18 around a central void. The angle of offset of the vanes 18 from the diameter line of assembly 20 affects the turbulent airflow achievable through use of the vanes, and may be adjusted to achieve maximal flow without undue experimentation by those skilled in the art. Typically an angle of about 30° is useful.

It is evident from the foregoing discussion that a number of materials and structures may be substituted for those specifically described herein. For example, condensation surfaces may be made from indigenous rocks or from special materials, or any combination thereof; the system may be as depicted, or may be square, polyhedron-shaped, or of any other convenient shape. The invention is limited only by the scope of the claims appended hereto.

What is claimed is:

1. A system for collection of atmospheric water comprising:
    a) a condensation material within said system providing condensation surfaces;
    b) an aperture at the top of said system adapted to allow airflow therethrough;
    c) means for conducting a flow of moisture-containing air from outside said system into said system into contact with said condensation surface;
    d) a solar-heated liquid tank for inducing said flow of moisture-containing air through said system via a stack effect;
    e) heat-conductive means for transferring heat out of said system and cooling said condensation surface; and
    f) collection means for collecting water condensed on said condensation surface.

2. The system of claim 1 wherein said condensation surface comprises a porous capillary material.

3. The system of claim 1 wherein said means for conducting a flow of air comprise air ducts placed near the bottom of said system.

4. The system of claim 1 wherein said means for inducing a flow of air comprise means for heating air at the top of said system.

5. The system of claim 4 wherein said means for heating air comprise a solar-heated material.

6. The system of claim 1 wherein said means for inducing a flow of air comprise cyclonic flow generators within said system.

7. The system of claim 1 wherein said water-collection means comprise an inverted cone.

8. The system of claim 7 wherein said water-conducting means comprise a drain at the bottom of said inverted cone.

9. The system of claim 1 wherein said heat-conductive means comprise a heat transfer material extending into said system from the surrounding atmosphere.

10. The system of claim 1 wherein said heat-conductive means comprise a plurality of sealed tubes containing a heat-transfer agent extending into said system from the surrounding atmosphere.

11. The system of claim 10 wherein said heat-transfer agent is water.

12. The system of claim 11 wherein said tubes are ribbed.

13. A system for collection of atmospheric water comprising:
    a) a system having an aperture pipe at the top thereof adapted to allow airflow therethrough;
    b) a condensation surface within said system comprising a porous, capillary material;
    c) means for conducting a flow of moisture-containing air from outside said system into said system into contact with said condensation surface comprising air ducts near the bottom of said system;
    d) a solar-heated liquid tank for inducing a flow of moisture-containing air through said system via a stack effect comprising solar-heated water near the top of said system;
    e) heat-conductive means for transferring heat out of said system and cooling said condensation surface comprising a heat-conductive material extending into said system from the surrounding atmosphere;
    f) collection means for collecting water condensed on said condensation surface;
    g) water-conducting means for conducting condensed water out of said system;
said system being adapted and constructed such that atmospheric water is collected therefrom without the use of an artificial energy supply.

14. The system of claim 13 wherein said heat-conductive means comprise ribbed sealed tubes containing water.

15. A method for condensing water from the atmosphere comprising:
    a) placing in an environment suitable for condensing water from the atmosphere a system comprising an aperture pipe at the top thereof adapted to allow airflow therethrough, a condensation surface within said system, means for conducting a flow of moisture-containing air from outside said system into said system into contact with said condensation surface, solar-heated liquid tank for inducing a flow of moisture-containing air through said system via a stack effect; heat-conductive means for transferring heat out of said system and cooling said condensation surface, collection means for collecting water condensed on said condensation surface, and water-conducting means for conducting condensed water out of said system;
    b) allowing said heat-conductive means to cool the interior of said system when the temperature inside the system exceeds the temperature outside the system;
    c) allowing said means for inducing a flow of air from outside said system to cause air to flow through said system and out the top of said system through said aperture;
    d) allowing moisture in said air flowing through said system to condense on said condensation surface and drop therefrom into said water collection means and flow therefrom into said water conducting means;
    e) collecting the water in said water conducting means.

16. A method of making a system for collection of atmospheric water comprising providing and assembling:
    a) a condensation material;
    b) an aperture at the top of said system adapted to allow airflow therethrough;
    c) means for conducting a flow of moisture-containing air from outside said system into said system such that it comes into contact with said condensation material;
    d) a solar-heated liquid tank for inducing a flow of moisture-containing air through said system via a stack effect;
    e) heat-conductive means for extending into said system from the surrounding atmosphere for transferring heat out of said system and cooling said condensation material;

f) collection means within said system for collecting water condensed on said condensation material;

g) water-conducting means for conducting condensed water out of said system.

17. A system for collection of atmospheric water comprising:

a) a condensation material within said system providing condensation surfaces;

b) an aperture at the top of said system adapted to allow airflow therethrough;

c) means for conducting a flow of moisture-containing air from outside said system into said system into contact with said condensation surface;

d) means for inducing said flow of moisture-containing air through said system comprising a solar-heated liquid tank for heating air at the top of said system;

e) heat-conductive means for transferring heat out of said system and cooling said condensation surface; and f) collection means for collecting water condensed on said condensation surface.

18. A system for collection of atmospheric water comprising:

a) a condensation material within said system providing condensation surfaces;

b) an aperture at the top of said system adapted to allow airflow therethrough;

c) means for conducting a flow of moisture-containing air from outside said system into said system into contact with said condensation surface;

d) a radiation bulb for inducing said flow of moisture-containing air through said system via a stack effect;

e) heat-conductive means for transferring heat out of said system and cooling said condensation surface; and f) collection means for collecting water condensed on said condensation surface.

19. A system for collection of atmospheric water comprising:

a) a porous, capillary condensation material within said system providing condensation surfaces;

b) an aperture at the top of said system adapted to allow airflow therethrough;

c) means for conducting a flow of moisture-containing air from outside said system into said system into contact with said condensation surface;

d) temperature-responsive means for inducing said flow of moisture-containing air through said system via a stack effect;

e) heat-conductive means for transferring heat out of said system and cooling said condensation surface; and f) collection means for collecting water condensed on said condensation surface.

* * * * *